US006813629B1

(12) United States Patent
Kocherlakota et al.

(10) Patent No.: US 6,813,629 B1
(45) Date of Patent: Nov. 2, 2004

(54) METHOD AND APPARATUS FOR FACILITATING OBJECT COMMUNICATION ACROSS A NETWORK

(75) Inventors: Rama Rao Kocherlakota, Millbrae, CA (US); Seth Stafford, San Francisco, CA (US); George Buzsaki, Fremont, CA (US)

(73) Assignee: Oracle International Corporation, Redwood Shores, CA (US)

( * ) Notice: Subject to any disclaimer, the term of this patent is extended or adjusted under 35 U.S.C. 154(b) by 722 days.

(21) Appl. No.: 09/286,124

(22) Filed: Apr. 2, 1999

(51) Int. Cl.[7] .............................................. G06F 15/16
(52) U.S. Cl. ...................................... 709/203; 709/316
(58) Field of Search ................................ 709/201, 203, 709/241, 316; 705/34; 707/10; 711/118; 717/11

(56) References Cited

U.S. PATENT DOCUMENTS

| | | | | | |
|---|---|---|---|---|---|
| 5,410,703 | A | * | 4/1995 | Nilsson et al. ................. | 717/11 |
| 5,822,585 | A | * | 10/1998 | Noble et al. ................. | 709/316 |
| 6,070,228 | A | * | 5/2000 | Belknap et al. ............. | 711/118 |
| 6,256,675 | B1 | * | 7/2001 | Rabinovich ................. | 709/241 |
| 6,304,857 | B1 | * | 10/2001 | Heindel et al. ............... | 705/34 |

OTHER PUBLICATIONS

Itoh et al, Using meta–object to support optimsation in the Apertos operating system, 1995.*
Itoh et al, Using Meta–objects to Support Otimisation in the Apertos Operating system, 1995.*
Aldrich et al, Providing Easier Access to Remote Objects in Clien–Server Systems, IEEE 1998.*

* cited by examiner

Primary Examiner—Thong H. Vu
(74) Attorney, Agent, or Firm—Christian A. Nicholes; Hickman Palermo Truong & Becker LLP

(57) ABSTRACT

The present invention provides a framework for enabling an object oriented paradigm to be implemented in a networked environment. The framework comprises a client dispatcher object for managing the network communications of objects on the client's side, and a server dispatcher object for managing the network communications of objects on the server's side. The dispatcher objects cooperate with each other to send messages from the associated objects across the network in batches. By collecting and sending messages in batches, the dispatchers minimize the number of network round trips that need to be incurred, thereby minimizing network traffic. The framework further comprises a proxy interface for enabling the dispatcher objects to communicate with their associated objects. The proxy interface sets forth a set of methods that each of the associated objects needs to implement in order to participate in the communication scheme of the present invention. By providing an implementation for the proxy interface, any object having any desired functionality will be able to take advantage of the framework of the present invention. This openness of the proxy interface makes it possible to take full advantage of the flexibility, extensibility, and robustness offered by object oriented technology. By providing the structure needed to control network traffic without placing any limitations upon the functionality of the objects, the framework of the present invention provides an effective mechanism for implementing an object oriented paradigm in a networked environment.

38 Claims, 3 Drawing Sheets

METHOD AND APPARATUS FOR FACILITATING OBJECT COMMUNICATION ACROSS A NETWORK

FIELD OF THE INVENTION

This invention relates generally to computer systems, and more particularly to a method and apparatus for facilitating communication by objects across a network.

BACKGROUND OF THE INVENTION

For a number of years now, the computing model that has been used predominantly in large companies has been the client-server model. According to this model, a plurality of clients are connected to one or more data servers via a network to form an overall centralized system. In a client-server system, each of the clients is responsible for storing and executing whatever applications are to be run on that client, while the servers are primarily used as central repositories for storing and managing data generated and used by the applications. The main advantage of a client-server system is that it allows data to be stored in a centralized location, thereby making it possible for multiple clients to access the same data. The major disadvantage of this type of system is high cost. Because each client is required to have sufficient capability to store and to execute applications (many of which can be resource intensive), each client is typically required to be a high power, and hence, relatively high cost machine (i.e. a "fat" client). Also, because each client maintains its own set of applications, the cost of maintaining the system can be quite high. Each application on each client must be set up and configured individually, and each client, in the event of a software upgrade, must be upgraded individually. For a large company with a large number of client machines, the cost of maintaining the system can be exorbitant.

Because of the high cost associated with client-server systems, there has been a trend in recent years towards a "thin client" model of computing. According to this model, much of the processing burden is moved off of the clients onto a centralized application server. The application server is coupled to a plurality of clients via a network, and is responsible for storing and executing the applications requested by those clients. In a thin client system, the application server may also serve as the central data repository, or it may be coupled to a data server which serves as the central data repository, thereby giving rise to a three-tier architecture. Whatever form the overall system takes, the clients in a thin client system are relieved of most of the application execution burden. Primarily, the clients are responsible for rendering the user interface (UI) and performing other relatively simple functions. Because the clients are required to perform only relatively simple tasks, they may take the form of simple, low cost machines having minimal processing and storage capabilities. This gives rise to one of the main advantages of a thin client system, which is that of reduced cost. Because each client may be a low cost machine, the overall equipment cost of the system is significantly reduced. Also, because the applications are stored and executed in a centralized application server, the system is much simpler to maintain. Only the application server needs to be configured for each application, and only the application server needs to be upgraded. As a result, a thin client system is much more economical to implement and to maintain than a client-server system.

A thin client system provides significant cost advantages; however, these advantages come at the expense of increased network traffic. Because most of the application logic processing is performed by the application server, but all of the user input/output is received/rendered by the client, a significant amount of communication is conducted between the client and the application server. This communication is conducted across a network, which is a limited and scarce resource. In any computer implementation involving a network, one of the utmost concerns is that of minimization of network traffic. With excessive traffic, a network can quickly become the bottleneck of the entire system. Hence, for any application that is designed to run in a thin client environment, it is necessary for the application to manage communications across the network efficiently so that the network is not overly burdened.

One approach that has been taken to limit network traffic involves the implementation of a specific protocol between the client and the server using two separate processes, one process executing on the client and the other process executing on the server. These processes, which are specifically designed to understand messages from the other process, perform two main functions. First, each process interprets messages received from the other process to carry out functions indicated by those messages. For example, the client process receives messages from the server process indicating which items to render on the display. In response, the client process interprets the messages and renders the appropriate items. Because the processes are specifically developed to understand each other's messages, a very streamlined protocol can be implemented to minimize the amount of information that needs to travel across the network. A second function performed by the processes is the minimization of the number of messages that are sent across the network. This is typically achieved by bundling a plurality of sets of information into a single message. By putting multiple sets of information into a single message, the number of messages that need to be sent across the network is minimized. This approach has been implemented both in applications and in tools for facilitating the development of applications to minimize network traffic.

The above approach is effective for controlling network traffic; however, it achieves network performance at the expense of flexibility. One of the major drawbacks of this approach is that it does not allow users to freely define their own UI items. They may utilize only the items that the two processes have been designed and hard coded to recognize. For example, if the client and server processes know how to render a certain UI button, but the user needs to render a new customized UI button, the user will not be able to render the customized button unless the code for the client and server processes are altered. If the user has access to the source code, this may not be an overly burdensome process. However, if the user does not have access to the source code, which is often the case, especially in the tools arena, then the user would have to submit a request to the tools vendor to change the code. If the vendor agrees to make the change, then the vendor would have to go through the design and implementation process to effect the change. Thereafter, the vendor would have to release a new version of the software with the changes incorporated therein. This process could take several months, which is much too long to be practicable. As a result, the above approach is too rigid for many implementations.

A much more flexible and desirable approach to implementing a UI is the object oriented approach. Under this approach, the UI is composed of a plurality of independent objects, each object capable of independent operation and communication with the server, and each object capable of invoking the methods of other objects. In the object oriented paradigm, because each object is an independent entity, it is a relatively simple matter to: (1) replace one object with another; and (2) add new object classes. For example, if the user wishes to render a new type of button in the UI, the user simply defines the new type of button, and then starts using that new button in the UI. There is no need to enlist the aid of a tools vendor. Because it is so flexible and extensible, the object oriented paradigm is the preferred approach for implementing UI's.

One problem with implementing an object oriented paradigm in a networked environment, however, is that it tends to create a high volume of network traffic. As noted above, each object is an independent entity responsible for its own communication. This means that each time an object needs to send a message to the server, it incurs a network round trip. With a relatively large number of objects, this can quickly generate enough traffic to choke most networks. Despite its impracticability, this approach is the one set forth by the Common Object Request Broker Architecture (CORBA) and the Java Remote Method Invocation (RMI) standards. Although implementing an object oriented paradigm is difficult in a networked environment, it is still quite desirable because it provides a richness and a robustness that cannot be matched by other approaches, especially in the graphical user interface (GUI) arena. Thus, the challenge is to develop a mechanism which enables an object oriented paradigm to be implemented in a networked environment without causing the network to be overburdened.

SUMMARY OF THE INVENTION

The present invention provides a novel and advantageous framework for enabling an object oriented paradigm to be implemented effectively in a networked environment. The framework provides the necessary structure for controlling and managing the communications of the objects to prevent the objects from overloading the network with excessive traffic. At the same time, the framework does not limit, but rather works with the independent nature of the objects to carry out the control and management functions. By providing structure without sacrificing the flexibility, extensibility, and robustness of object oriented technology, the framework of the present invention provides a complete solution to the challenge posed above.

According to one embodiment, there is provided a pair of objects for managing the flow of information between the server and the client. These objects include a client dispatcher object which executes on the client, and a server dispatcher object which executes on the server. Each dispatcher is responsible for managing the network communication of the objects on its side. That is, the client dispatcher is responsible for managing the network communication of the objects on the client side, while the server dispatcher is responsible for managing the network communication of the objects on the server side. The client dispatcher object and the server dispatcher object communicate with each other using an underlying network communication mechanism, such as a CORBA object request broker (ORB), which allows method calls to be made across a network. The primary responsibility of these dispatchers is to manage the flow of messages between the client and the server. Specifically, each of the dispatchers is responsible for: (1) collecting messages from a plurality of associated objects and assembling them into a batch; (2) sending the messages as a batch across the network to the other dispatcher; (3) receiving a message batch from the other dispatcher; (4) extracting the individual messages from the message batch; and (5) distributing the individual messages to the associated objects to which the messages are intended. By collecting and sending messages in batches, the dispatchers minimize the number of network round trips that need to be incurred, thereby minimizing network traffic.

The present invention further provides a mechanism for facilitating communication between the dispatchers and their associated objects. This mechanism is needed by the dispatchers in order to manage the network communications of their associated objects. In one embodiment, this mechanism takes the form of an interface referred to herein as "proxy". The proxy interface sets forth a set of methods that each of the associated objects needs to implement in order to participate in the communication scheme of the present invention. The methods of the proxy interface are invoked by the dispatchers to communicate with the individual associated objects. Note that the proxy interface merely specifies the methods that each of the associated objects should implement. It does not provide any specific implementation for any of the methods. It will be up to each of the associated objects to provide its own implementation for each of the specified methods (i.e. to implement proxy). The implementations provided by each object may be different, so that each object may customize its own behavior.

In operation, the framework is used as follows. Whenever an object on the client side (a client object) wishes to send a message to a peer object on the server side (a server object), the client object sends the message to the client dispatcher. The client dispatcher stores the message into a buffer. The client dispatcher continues to store messages from client objects into the buffer until it is instructed by one of the client objects, such as a coordinator object, to incur a network round trip. Once that occurs, the client dispatcher sends the messages stored in the buffer across the network as a batch to the server dispatcher. In response, the server dispatcher parses the individual messages from the message batch, and distributes them to the server objects for which they are intended. In performing the distribution function, the server dispatcher invokes the proxy interface implementations of the server objects.

Thereafter, the server objects process the messages and perform whatever functions are needed in response to the messages. Once the processing is performed, the server objects generate return messages for their peer client objects. These messages are then sent to the server dispatcher. The return messages are stored by the server dispatcher into a buffer, and then sent as a batch across the network to the client dispatcher. In response, the client dispatcher parses the individual messages from the message batch, and distributes them to the client objects for which they are intended. In performing the distribution function, the client dispatcher invokes the proxy interface implementations of the client objects. In this manner, messages between objects are efficiently transferred across the network.

Several points should be noted with regard to the present invention. First, note that rather than incurring a round trip for each message, the objects send their messages to a corresponding dispatcher. In turn, the dispatchers collect the messages, and send them across the network in the form of a batch. By doing so, the dispatchers limit the number of round trips that are taken across the network, thereby minimizing network traffic. Thus, the framework of the present invention provides the necessary structure for keeping network traffic to a minimum. At the same time, the framework does not impose limits on the functionality of the individual objects. The user is free to impart whatever functionality he wishes to each object, and each object is allowed to behave as an independent object. As a result, each object may be easily replaced with another object, and new object classes may be easily added. If a user needs a new type of object (e.g. a new type of UI button), all he needs to do is to create the new object type and to start using it. There is no need to go back to any tools vendor. So long as the new object type provides an implementation for the proxy interface, it will be able to participate in the communication scheme of the present invention.

In effect, the framework of the present invention separates the communication aspect of an object from the functional aspect. The framework provides the structure needed to effectively manage the communication aspect to minimize network traffic, but leaves the functional aspect completely up to the developer. By separating these two aspects, the framework makes it possible to both manage network traffic and to take full advantage of the flexibility, extensibility, and richness offered by object orient technology. Thus, the present invention provides an effective mechanism for implementing an object oriented paradigm in a networked environment.

DETAILED DESCRIPTION OF THE PREFERRED EMBODIMENT(S)

Overview

The present invention provides a framework for effectively implementing an object oriented paradigm in a networked environment. According to one embodiment, the framework comprises a client dispatcher object class, a server dispatcher object class, and a proxy interface. When instantiated on a client, the client dispatcher object class gives rise to a client dispatcher object, which is responsible for managing the network communications of the objects on the client's side. Likewise, when instantiated on a server, the server dispatcher object class gives rise to a server dispatcher object, which is responsible for managing the network communications of the objects on the server's side. The two dispatcher objects communicate with each other to transport messages across the network. Together, the two dispatcher objects provide the structure and mechanism necessary for managing and controlling object-generated traffic between the client and the server across the network.

In managing the network traffic generated by their associated objects, the dispatcher objects need to communicate with their associated objects. The proxy interface provides the mechanism for facilitating this communication. Specifically, the proxy interface sets forth the methods that each of the associated objects needs to implement in order to participate in the communication scheme of the present invention. These methods are invoked by the dispatcher objects to communicate with the associated objects. A point to note with regard to the proxy interface is that it does not provide any implementation for any of the methods that are specified in the interface. The interface merely sets forth the methods that need to be implemented. It is up to each of the associated objects to provide its own implementation for each of the specified methods (i.e. to implement proxy). By leaving the implementation up to each associated object, the framework of the present invention makes it possible for each associated object to customize the implementation to meet its own needs. It also makes it possible for any object to participate in the communication scheme of the present invention. So long as an object provides an implementation for the proxy interface, it will be able to communicate with the dispatcher objects, and hence will be able to take advantage of the communication structure provided thereby. Thus, the openness of the proxy interface gives rise to great flexibility and extensibility. Because of its ability to effectively manage network traffic without placing limitations upon the functionality of the associated objects, the framework of the present invention may be used effectively to develop and to deploy sophisticated and robust object oriented applications in a networked environment.

Figure 1:
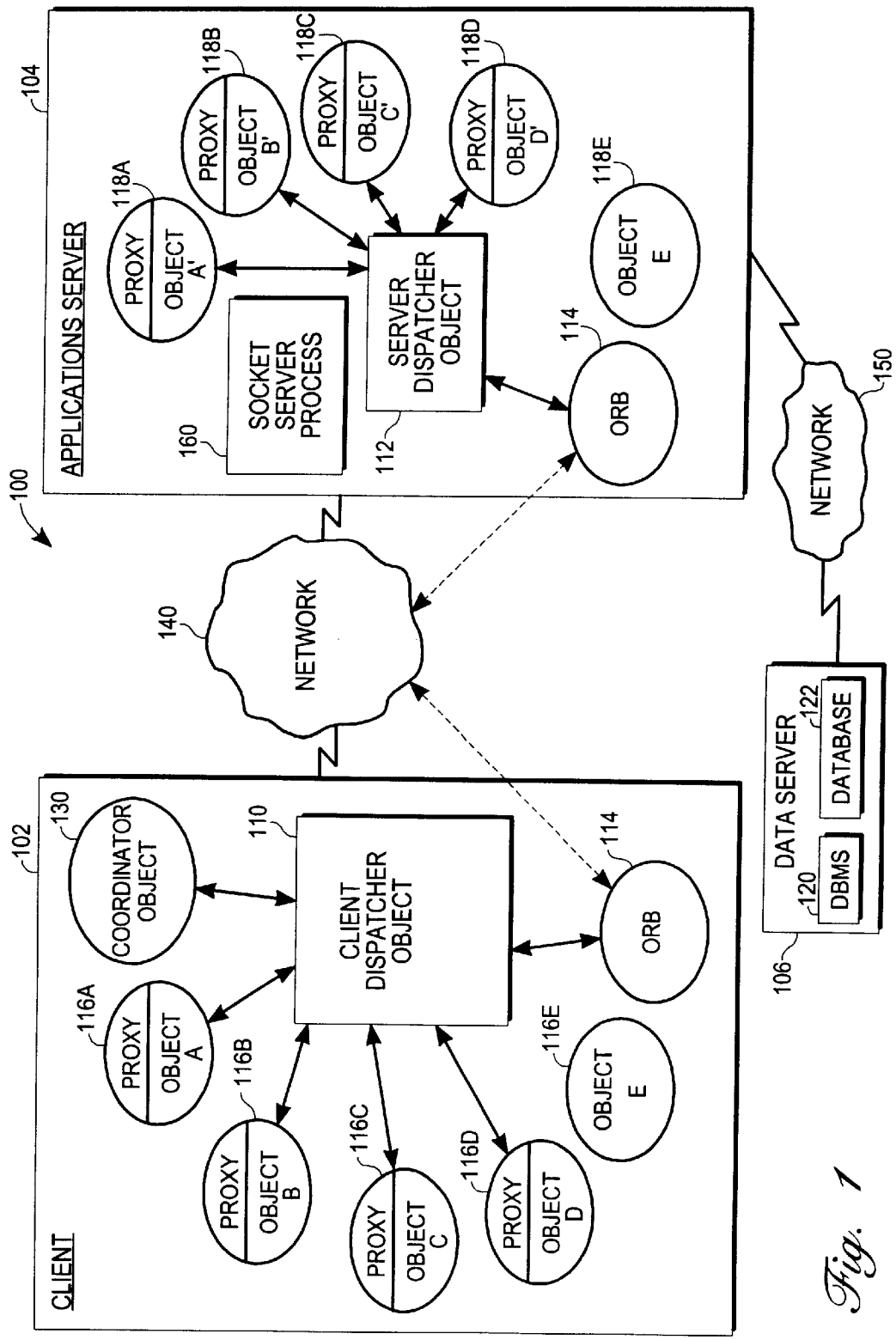
FIG. 1 is a functional block diagram of a system in which the framework of the present invention may be implemented.

With reference to FIG. 1, there is shown a functional block diagram of a system 100 in which the framework of the present invention may be implemented, the system 100 comprising a client 102, an applications server 104, and a data server 106. For the sake of simplicity, only one client 102 is shown in FIG. 1, but it should be noted that multiple clients 102 may be coupled to and serviced by the applications server 104. In system 100, it is the applications server 104 that is primarily responsible for storing and executing applications. The client 102 is mainly responsible for rendering the UI and performing other simple functions. As a result, the client 102 may be a computer having limited processing and storage capabilities (i.e. may be a thin client). The client 102 and the applications server 104 may be coupled to each other via a network 140.

In carrying out its application execution function, the applications server 104 may and often will need to access and store data. This data may be maintained within a data server 106. The data server 106 may implement any system for storing data, ranging from a simple file system to a sophisticated database management system (DBMS) 120 for managing a database 122. The applications server 104 may be coupled to the data server 106 via a network 150. In the system 100 illustrated in FIG. 1, the applications server 104 and the data server 106 are shown as separate and distinct machines. While this gives rise to an advantageous three-tier architecture which is often used, it should be noted that if so desired, the functionality of the data server 106 may be incorporated into the application server 104, thereby eliminating the need for the data server machine. This and other modifications are within the scope of the present invention.

System 100 implements the framework of the present invention. Specifically, on the client 102 side, there is instantiated a client dispatcher object 110 in accordance with the present invention. Along with the client dispatcher 110, other objects (client objects) may also be instantiated, including client objects 116a–116d that need to send messages across the network 140, client objects 116e that do not need to send messages across the network 140, and an optional coordinator object 130. For each of the objects 116a–116d that needs to communicate across the network 140, an implementation for the proxy interface is provided, as indicated by the presence of the word "proxy" inside the object. These proxy implementations are invoked by the client dispatcher 110 to communicate with the objects 116a–116d. For those objects 116e that do not need to communicate across the network 140, no proxy implementation is needed.

As to the coordinator object 130, its function is to coordinate the timing of the sending of messages. This includes coordinating the sending of messages from the objects 116a–116d to the client dispatcher 110, and the sending of a message batch by the client dispatcher 110 across the network 140. An example of a coordinator object 130 may be a "submit" button on a registration form wherein the objects 116a–116d are the fields on the form. After the fields have been filled in with information and the "submit" button is selected, the coordinator object 130 causes each of the objects 116a–116d to send a message (i.e. the contents of the field) to the client dispatcher 110, and then causes the client dispatcher 110 to send the batch of messages received from the objects 116a–116d across the network 140. The coordinator object 130 is an optional object. Its function may be performed instead by one or more of the other objects 116a–1116d.

On the server 104 side, there is implemented a server dispatcher object 112 in accordance with the present invention. Along with the server dispatcher 112, other objects (server objects) may also be instantiated, including server objects 118a–118d that need to send messages across the network 140, and server objects 1118e that do not need to send messages across the network 140. For each of the objects 118a–118d that needs to communicate across the network 140, an implementation for the proxy interface is provided, as indicated by the presence of the word "proxy" inside the object. These proxy implementations are invoked by the server dispatcher 112 to communicate with the objects 118a–118d. For those objects 118e that do not need to communicate across the network 140, no proxy implementation is provided.

According to one embodiment, each of the client objects 116a–116d that needs to communicate across the network 140 has a corresponding peer server object 118a–118d on the server 104 side. As shown in the system 100 of FIG. 1, the client object A 116a has a peer server object A' 118a, the client object B 116b has a peer server object B' 118b, the client object C 116c has a peer server object C' 118c, and the client object D 116d has a peer server object D' 118d. Each object in a pair of peer objects is designed and coded to understand the messages sent by the other peer object, and each object communicates with its peer object to carry out one or more specific functions. As noted previously, in a thin client system, most of the logic processing is performed on the server 104. The client 102 is mainly responsible for rendering the UI. Thus, in system 100, it is the server objects 118a–18d that perform most of the logic processing. The client objects 116a–116d mostly provide input from and output to the user. As an example, the client object A 116a may include code for implementing a button that a user selects to generate a report, while the peer server object A' 118a may be the entity that performs the operations necessary for actually generating the report.

At this point, it should be noted that the client objects 116a–116d and the server objects 118a–118d may be programmed by an application developer to perform any desired function or functions. These functions may range from basic, rudimentary functions, such as storing a value, to highly complex ones, such as interacting with the DBMS 120 to generate a report based upon the data stored in the database 122. The framework of the present invention places no limitations upon the functionality of the objects. So long as each of the objects provides an implementation for the proxy interface, the object will be able to take advantage of the communication mechanism provided by the dispatcher objects 110, 112. Thus, the framework provides the structure and mechanism necessary for managing traffic across the network 140 without sacrificing any of the flexibility, extensibility, richness, and robustness offered by object oriented technology.

Communication across the network 140 between the client 102 and the server 104 is controlled by the dispatcher objects 110, 112. More specifically, the dispatchers 110, 112 send communications to each other to convey messages between the client 102 and the server 104. In conducting these communications, the dispatchers 110, 112 use an underlying communication mechanism, such as a CORBA object request broker (ORB) 114, which allows method calls to be made across a network 140. Hereinafter, for the sake of convenience, the dispatchers 110, 112 will be described as sending communications to each other; however, it should be realized that these communications are actually sent via the underlying communication mechanism 114.

One of the primary purposes of the dispatchers 110, 112 is to minimize the number of communications that are sent across the network 140. To achieve this purpose, each of the dispatchers 110, 112 collects multiple messages from objects, and stores them into a buffer. When it comes time to send the messages across the network 140, each of the dispatchers 110, 112 sends the messages as a batch. By collecting and sending messages in batches, the dispatchers 110, 112 minimize the number of network round trips that need to be incurred. This in turn helps to minimize the amount of traffic experienced by the network 140.

The general flow of operation of system 100 in accordance with the present invention is as follows. Whenever a client object 116a–116d wishes to send a message to a peer server object 118a–118d, rather than incurring a network round trip, the client object 116a–116d sends the message to the client dispatcher 110. In response, the client dispatcher 110 stores the message into a buffer. The client dispatcher 110 continues to store messages from client objects 116a–116d into the buffer until it is instructed by one of the client objects 116a–116d, or by the coordinator object 130, to incur a network round trip. Once that occurs, the client dispatcher 110 sends the messages stored in the buffer across the network 140 as a batch to the server dispatcher 112. In response, the server dispatcher 112 parses the individual messages from the message batch, and distributes them to the peer server objects 118a–118d for which they are intended. In performing the distribution function, the server dispatcher 112 invokes the proxy interface implementations provided by the server objects 118a–118d.

Thereafter, the server objects 118a–118d process the messages and perform whatever functions are needed in response to the messages. Once the processing is performed, the server objects 118a–118d generate return messages for their peer client objects 116a–116d. These return messages are sent to the server dispatcher 112. The return messages are stored by the server dispatcher 112 into a buffer, and then sent as a batch across the network 140 to the client dispatcher 110. In response, the client dispatcher 110 parses the individual messages from the message batch, and distributes them to the peer client objects 116a–116d for which they are intended. In performing the distribution function, the client dispatcher 110 invokes the proxy interface implementations provided by the client objects 116a–116d. A complete network round trip is thus completed. In this manner, messages between multiple independent objects are transferred across the network 140 with minimal traffic.

Thus far, the invention has been described from an overview perspective. With this overview in mind, the details of one possible embodiment of the framework will now be described. It should be noted that the following details are provided for illustrative purposes only. Various modifications may be made by those of ordinary skill in the art without departing from the spirit and scope of the present invention. As previously stated, the framework comprises a client dispatcher object class, a server dispatcher object class, and a proxy interface. The specifications for these components are as follows.

The Client Dispatcher Object Class

The client dispatcher object class is the object class that is downloaded onto a client 102. When instantiated by the client, this object class gives rise to the client dispatcher object 110 which is responsible for managing the network communications of the client objects 116a–116d. The client dispatcher object class declares and provides an implementation for a plurality of methods which are invoked in carrying out the communication scheme of the present invention. These methods include, but are not limited to, the following:

(1) ConnectProxy—This method is invoked by a client object to register itself with the client dispatcher. It causes the client dispatcher to assign an identification (ID) to the client object, and to store a reference to the object, which is later used by the client dispatcher to communicate with the object. It also causes the client dispatcher to send a message to the server dispatcher to cause the server dispatcher to instantiate a peer server object. This peer server object will be the object on the server with which the client object communicates. Overall, the ConnectProxy method lays the necessary foundation for enabling the client object to send messages across the network. The ConnectProxy method is preferably invoked by the client object prior to sending any messages to the client dispatcher.

(2) WriteItem—This method is invoked by a client object or by the client dispatcher to send a message across the network. It causes the client dispatcher to receive from the object the message that the object wishes to send, and to store the message into a message buffer. The message will be sent the next time the client dispatcher incurs a network round trip.

(3) WriteSynch—This method is invoked by a client object to send a message immediately across the network. It causes the client dispatcher to receive from the client object the message that the client object wishes to send, and to send the message immediately across the network. Because it has a tendency to create increased network traffic, this method is preferably used sparingly.

(4) Send—This method is invoked by a client object or a coordinator object to cause the client dispatcher to incur a network round trip. Specifically, it causes the client dispatcher to send the messages stored in the message buffer, as a batch, across the network to the server dispatcher. It also causes the client dispatcher to receive responses to the messages, and to distribute those responses to the objects for which they are intended.

The Server Dispatcher Object Class

The server dispatcher object class resides on the server 104. When instantiated, this object class gives rise to the server dispatcher object 112 which is responsible for managing the network communications of the server objects 118a–118d. The server dispatcher object class declares and provides an implementation for a plurality of methods which are invoked by the client dispatcher object 110 in carrying out the communication scheme of the present invention. These methods include, but are not limited to, the following:

(1) Receive—This method is invoked by the client dispatcher when it sends a message batch across the network in response to a "Send" method invocation. It causes the server dispatcher to receive the message batch, to parse the individual messages from the message batch, and to distribute the individual messages to the peer server objects for which they are intended. It also causes the server dispatcher to collect return messages from the peer server objects and to send the return messages, as a batch, across the network to the client dispatcher.

(2) ReceiveSynch—This method is invoked by the client dispatcher when it sends a message across the network in response to a "WriteSynch" method invocation. It causes the server dispatcher to receive the message and to distribute it to the peer server object for which it is intended. It also causes the server dispatcher to collect a return message from the peer server object and to immediately send the return messages across the network to the client dispatcher.

(3) ReadItem—This method is invoked by the server dispatcher to read and to process a message that is intended for itself.

(4) CreateProxy—This method is invoked by the server dispatcher to form a peer to peer relationship between a particular client object and a server object. It causes the server dispatcher to instantiate a server object, to store a reference to the server object, and to associate the reference with the ID of the particular client object, thereby establishing the newly instantiated server object as the peer to the particular client object.

Proxy Interface

The proxy interface sets forth the methods that each object needs to implement in order to participate in the communication scheme of the present invention. These methods will be invoked by the dispatchers 110, 112 to communicate with the objects. Unlike the dispatcher object classes, the proxy interface does not provide any implementation for any of the specified methods. It will be up to each object to provide the implementations for the methods. The proxy interface methods include, but are not limited, the following:

(1) GetPeerType—When the client dispatcher receives a ConnectProxy method call from a client object, it interacts with the server dispatcher to instantiate a server object to be a peer to the client object. In order to do this, the client dispatcher needs to know what type of object to instantiate on the server. To ascertain the peer object type, the client dispatcher invokes the GetPeerType method of the client object that made the ConnectProxy method call.

(2) ReadItem—This method is invoked by either of the dispatchers to deliver a message to an object. This method causes the object to read and to process the message sent by its peer object.

Sample Implementation

Figure 2:
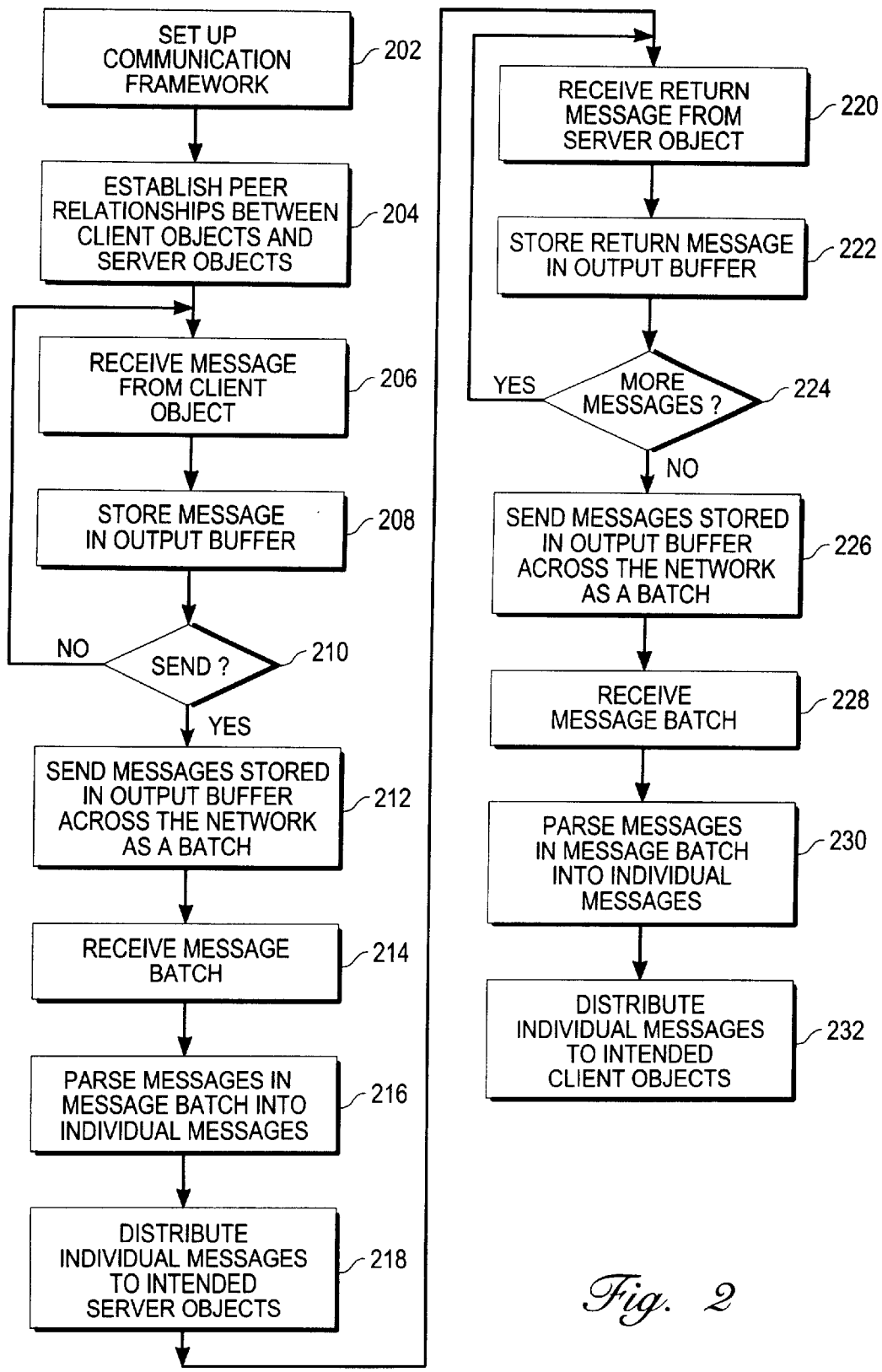
FIG. 2 is a flow diagram illustrating the flow of communications between a client and a server using the framework of the present invention.

To illustrate how the object classes and interface disclosed above may be used effectively in a networked environment, a detailed sample implementation will now be described with reference to the system diagram of FIG. 1 and the flow diagram of FIG. 2.

In system 100, there is stored on a server (the applications server 104 or another server which is not shown) a file which contains the code for all of the object classes that are to be implemented on the client 102, including the client dispatcher object class. This file has a universal resource locator (URL) associated therewith. When a client 102 running a standard browsing program accesses that URL, the file is caused to be downloaded, preferably in the form of a Java applet, from the server onto the client 102. Once downloaded, the applet is invoked by the client 102. Invocation of the applet causes various objects to be instantiated on the client 102, including the client objects 116a–116e, 130 and the client dispatcher object 110. Upon initial instantiation, the client dispatcher 110 makes a call to the socket server process 160 running on the applications server 104 to locate a peer server dispatcher object. Preferably, the applet contains sufficient information pertaining to the location of the socket server process 160 such that the client dispatcher 110 is able to locate the process 160. In response to this call, the socket server process 160 creates a new thread, and causes an instance of the server dispatcher object class to be executed by that thread. The server dispatcher object 112 is thus instantiated. Thereafter, the socket server process 160 sets up the underlying network communication mechanism 114 between the two dispatchers 110, 112 to enable the dispatchers to communicate with each other. Once that is done, the set up (step 202) of the communication framework is completed. The system 100 is now ready to handle object communications.

As noted previously, when the applet is invoked by the client 102, the client objects 116a–116d are instantiated. Once instantiated, these objects 116a–116d begin operation. At some point in their operation, one or more of these objects 116a–116d will need to communicate with the applications server 104 across the network 140. The first time that a client object 116a–116d needs to communicate across the network 140, it invokes the ConnectProxy method of the client dispatcher 110. In making this method invocation, the client object 116a–116d includes a reference to itself.

In response to this method call, the client dispatcher 110 assigns the client object 116a–116d an ID, associates the ID with the object's reference information, and stores the ID along with the reference information into a registry for future reference. The client dispatcher 110 then proceeds to set up a peer object on the server 112 with which the client object 116a–116d can communicate. Before the client dispatcher 110 can do this, however, it needs to know the type of object that the client object wants as a peer. To obtain this information, the client dispatcher 110 invokes the GetPeerType method of the client object 116a–116d. Since GetPeerType is one of the methods of the proxy interface, and since the client object 116a–116d provides an implementation for the proxy interface, the client dispatcher 110 is assured that it can make this method call. In response to the method call, the client dispatcher 110 receives from the client object 116a–116d the type of the desired peer object.

Once the peer object type is ascertained, the client dispatcher 110 instructs the server dispatcher 112 to create an instance of the desired peer object type on the server 104. The client dispatcher 110 does this by sending a message to the server dispatcher 112. This message includes the following information: (1) the ID associated with the client object 116a–116d; (2) the type of the desired peer object; and (2) an instruction for the server dispatcher 112 to create an instance of the desired peer object type. To send the message to the server dispatcher 112, the client dispatcher 110 invokes its own WriteItem method, which causes the message to be stored into an output buffer, possibly along with some other messages. The messages stored in the output buffer will be sent as a message batch to the server dispatcher 112 the next time the Send method of the client dispatcher 110 is invoked.

Suppose now that the client dispatcher's Send method is invoked by either the coordinator object 130 or one of the client objects 116a–116d. In response, the client dispatcher 110 invokes the Receive method of the server dispatcher 112, to send the message batch to the server dispatcher 112. In response to the Receive method call, the server dispatcher 112 parses the messages contained in the message batch into individual messages, and distributes the individual messages to the server objects for which they are intended. In this particular case, one of the messages is intended for the server dispatcher 112 itself; thus, the server dispatcher invokes it own ReadItem method to read and to process the message. In processing the message, the server dispatcher 112 notices that it needs to create an instance of a certain type of server object. To do this, it invokes its own CreateProxy method.

Under direction of the CreateProxy method, the server dispatcher 112 takes the peer object type specified in the message, and creates an instance of that object type on the server 104. Since it is instantiating the new server object, the server dispatcher 112 has a reference to it. The server dispatcher 112 then associates the ID specified in the message with the reference to the new server object, and stores both the ID and the reference into a registry for future reference. Since the ID associated with the new server object is the same as the ID associated with the client object that made the initial ConnectProxy call, the two objects are now linked to each other by the ID. In this manner, the objects are established (step 204) as peer objects. They may now send messages to each other across the network 140 using the dispatchers 110, 112. This process is used to establish all of the peer to peer relationships between the client objects 116a–116d and the server objects 118a–118d, including those between object A' 116a and object A', object B 116b and object B' 118b, object C 116c and object C' 118c, and object D 118c and object D' 118d. In this manner, each of the client objects 116a–116d is able to register itself with the dispatchers 110, 112 to enable it to communicate across the network 140.

The fact that this registration process is initiated and hence controlled by the objects 116a–116d rather than the dispatchers 110, 112 is significant. If the registration process were initiated and controlled by the dispatchers 110, 112, then each time a new object type is added to the system, the dispatchers 110, 112 would have to be changed to recognize and to accommodate the new object type. This leads to the problem encountered by the prior art, which is that new object types cannot be freely added to the system without changing the underlying mechanism. The present invention does not have this problem. Because each object 116a–116d is able to control its own registration, it is possible to freely add new object types to the system. So long as the new object types know how to interact with the dispatchers 110, 112 to initiate the registration process, and so long as they provide an implementation for the proxy interface, they will be able to participate in the communication scheme of the present invention. No changes need to be made to the dispatchers 110, 112. As a result, the present invention is much more flexible and extensible than the prior art.

Once peer to peer relationships have been established between the client objects 116a–116d and the server objects 118a–118d, the objects may send messages to each other across the network 140. Communication across the network is carried out as follows. Whenever a client object 116a–116d wishes to send a message to a peer server object 118a–118d, the client object 116a–116d invokes the WriteItem method of the client dispatcher 110 to send the message to the client dispatcher 110. The client object 116a–116d includes in this message a reference to itself. In response, the client dispatcher 110 receives (step 206) the message, and consults the registry to determine, based upon the object reference, the ID associated with the client object 116a–116d. Once the ID is determined, the client dispatcher 110 stores (step 208) the message, along with the ID, into an output buffer. The client dispatcher 110 continues to store messages from client objects 116a–116d into the output buffer until its Send method is invoked (step 208) by one of the client objects 116a–116d, or by the coordinator object 130.

When the Send method of the client dispatcher 110 is invoked, the client dispatcher 110 incurs a network round trip. Specifically, the client dispatcher 110 invokes the Receive method of the server dispatcher 112 to send (step 212) to it all of the messages currently stored in the output buffer. These messages are preferably sent across the network 140 as a batch. Once that is done, the client dispatcher 110 waits for a response from the server dispatcher 112.

In response to the Receive method call, the server dispatcher 112 receives (step 214) the message batch, and parses (step 216) the messages contained in the message batch into individual messages. It then determines to which server object 118a–118d each individual message should be distributed. To make this determination, the server dispatcher 112 extracts from each message the ID associated with that message. The server dispatcher 112 then consults the registry to locate the object reference associated with the ID. This object reference will point to the server object to which the message should be distributed. Once the object reference is extracted from the registry, it is used by the server dispatcher 112 to communicate with the proper server object 118a–118d. Specifically, the server dispatcher 112 invokes the ReadItem method of the proper server object 118a–118d and passes to it the appropriate message. Since ReadItem is one of the methods of the proxy interface, and since each of the server objects 118a–118d provides an implementation for the proxy interface, the server dispatcher 112 is assured that it can make this method call. When invoked, the ReadItem method causes the server object 118a–118d to read and to process the message passed by the server dispatcher 112. In this manner, the messages from the client objects 116a–116d are distributed (step 218) to the proper peer server objects 118a–118d.

Once the server objects 118a-I 18d receive the messages from the client objects 116a–116d, they process the messages and perform whatever functions are needed. As noted previously, these functions may be any functions desired by the object developers. Once the processing is performed, the server objects 118a–118d generate return messages for their peer client objects 116a–116d. These return messages are sent to the server dispatcher 112. Preferably, each return message includes a reference to the server object 118a–118d that sent the message. Upon receiving (step 220) each return message, the server dispatcher 112 consults the registry to determine, based upon the object reference, the ID associated with the server object 118a–118d. Once the ID is determined, the server dispatcher 112 stores (step 222) the message, along with the ID, into an output buffer. The server dispatcher 112 continues this process until all return messages have been stored into the output buffer. When all return messages have been received (step 224), the server dispatcher 112 sends (step 226) all of the messages stored in the output buffer across the network 140 to the client dispatcher 110 as a response to the Receive method call. These messages are sent as a batch to limit network traffic.

In the present embodiment, the server dispatcher 112 waits until all return messages have been received before sending a return message batch to the client dispatcher 110. While this is an effective strategy, it is not the only one. If so desired, the server dispatcher 112 may begin sending individual return messages to the client dispatcher 110 before all of the return messages have been received from the server objects 118a–118d. Such a scheme may be useful, for example, where some of the messages from the client objects 116a–116d have higher priority, and hence, require faster response than others. This and other modifications are within the scope of the present invention.

Upon receiving (step 228) the message batch from the server dispatcher 112, the client dispatcher 110 parses (step 230) the messages contained in the message batch into individual messages. It then determines to which client object 116a–116d each individual message should be distributed. To make this determination, the client dispatcher 110 extracts from each message the ID associated with that message. The client dispatcher 112 then consults its registry to locate the object reference associated with the ID. This object reference will point to the client object to which the message should be distributed. Once the object reference is extracted from the registry, it is used by the client dispatcher 112 to communicate with the proper client object 116a–116d. Specifically, the client dispatcher 110 invokes the ReadItem method of the proper client object 116a–116d and passes to it the appropriate message. Since ReadItem is one of the methods of the proxy interface, and since each of the client objects 116a–116d provides an implementation for the proxy interface, the client dispatcher 110 is assured that it can make this method call. When invoked, the ReadItem method causes the client object 116a–116d to read and to process the return message passed by the client dispatcher 110. In this manner, the return messages from the server objects 118a–18d are distributed (step 232) to the proper peer client objects 116a–116d. A complete network round trip is thus completed.

Thus far, the invention has been described with regard to asynchronous messages, i.e. messages that do not require an immediate network round trip. There may be instances, however, in which client objects 116a–116d may need immediate responses from the server 104. To accommodate such needs, a WriteSynch method is implemented by the client dispatcher 110, and a ReceiveSynch method is implemented by the server dispatcher 112. To send a synchronous message (a message requiring an immediate response), a client object 116a–116d, rather than invoking the WriteItem and Send methods, invokes the WriteSynch method of the client dispatcher 110. This causes the client dispatcher 110 to immediately send the client object's message across the network 140 to the server dispatcher 112. In sending the message, the client dispatcher 110 invokes the ReceiveSynch method of the server dispatcher 112. This method causes the server dispatcher 112 to process the message immediately and to provide an immediate response. Thus, these two methods provide an effective mechanism for handling synchronous messages. Hence, the framework of the present invention is capable of accommodating both types of messages.

Hardware Overview

Figure 3:
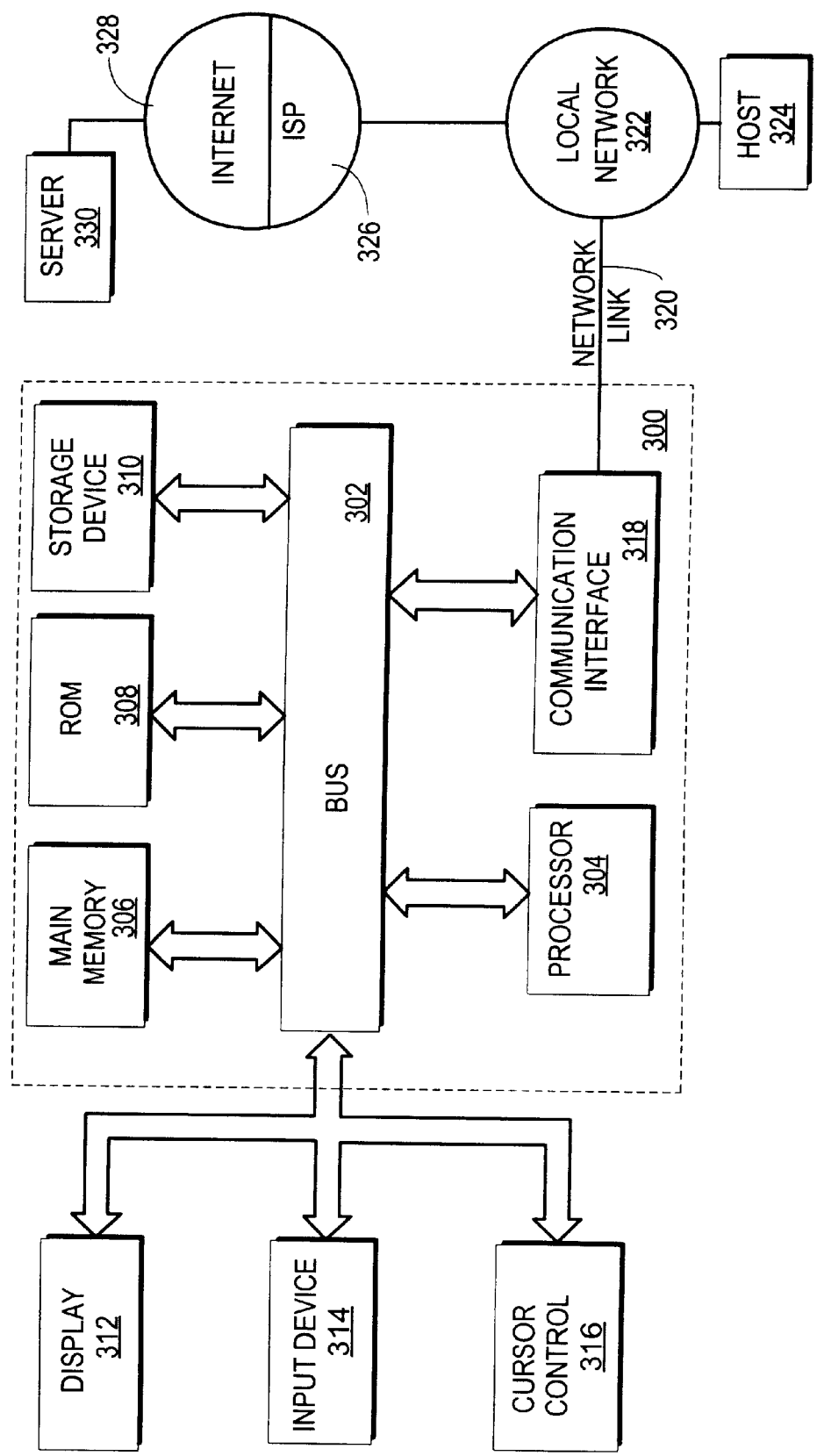
FIG. 3 is a block diagram of a computer system on which an embodiment of the present invention may be implemented.

FIG. 3 is a block diagram of a computer system 300 that may be used to implement the various machines of the system 100 shown in FIG. 1, including the client 102, the applications server 104, and the data server 106. Computer system 300 includes a bus 302 or other communication mechanism for communicating information, and a processor 304 coupled with bus 302 for processing information. Computer system 300 also includes a main memory 306, such as a random access memory (RAM) or other dynamic storage device, coupled to bus 302 for storing information and instructions to be executed by processor 304. Main memory 106 also may be used for storing temporary variables or other intermediate information during execution of instructions to be executed by processor 304. Computer system 300 further includes a read only memory (ROM) 308 or other static storage device coupled to bus 302 for storing static information and instructions for processor 304. A storage device 310, such as a magnetic disk or optical disk, is provided and coupled to bus 302 for storing information and instructions.

Computer system 300 may be coupled via bus 302 to a display 312, such as a cathode ray tube (CRT), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

According to a preferred embodiment, the functionality of the present invention is provided by computer system 300 in response to processor 304 executing one or more sequences of one or more instructions contained in main memory 306. Such instructions may be read into main memory 306 from another computer-readable medium, such as storage device 310. Execution of the sequences of instructions contained in main memory 306 causes processor 304 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 304 for execution. Such a medium may take many forms, including but not limited to, non-volatile media, volatile media, and transmission media. Non-volatile media includes, for example, optical or magnetic disks, such as storage device 310. Volatile media includes dynamic memory, such as main memory 306. Transmission media includes coaxial cables, copper wire and fiber optics, including the wires that comprise bus 302. Transmission media can also take the form of acoustic or electromagnetic waves, such as those generated during radio-wave, infra-red, and optical data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 304 for execution. For example, the instructions may initially be carried on a magnetic disk of a remote computer. The remote computer can load the instructions into its dynamic memory and send the instructions over a telephone line using a modem. A modem local to computer system 300 can receive the data on the telephone line and use an infra-red transmitter to convert the data to an infra-red signal. An infra-red detector can receive the data carried in the infra-red signal and appropriate circuitry can place the data on bus 302. Bus 302 carries the data to main memory 306, from which processor 304 retrieves and executes the instructions. The instructions received by main memory 306 may optionally be stored on storage device 10 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world wide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are exemplary forms of carrier waves transporting the information.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318. The received code may be executed by processor 304 as it is received, and/or stored in storage device 310, or other non-volatile storage for later execution. In this manner, computer system 300 may obtain application code in the form of a carrier wave.

At this point, it should be noted that although the invention has been described with reference to a specific embodiment, it should not be construed to be so limited. Various modifications can be made by those of ordinary skill in the art with the benefit of this disclosure without departing from the spirit of the invention. Thus, the invention should not be limited by the specific embodiments used to illustrate it but only by the scope of the appended claims.

What is claimed is:

1. A computer implemented method for facilitating communication between objects across a network, comprising the acts of:

receiving on a second side of a network a message batch from a first side of said network, said message batch comprising a plurality of messages from a first plurality of objects;

parsing said plurality of messages from said message batch; and distributing said plurality of messages to a second plurality of objects, wherein each of said second plurality of objects provides an implementation for a common interface which is invoked to distribute said plurality of messages to said second plurality of objects.

2. The method of claim 1, wherein each of said second plurality of objects is an independent object capable of independent operation and communication.

3. The method of claim 1, wherein the acts of receiving, parsing, and distributing are carried out by a client dispatcher which executes on a client, and wherein said client dispatcher invokes said common interface to distribute said plurality of messages to said second plurality of objects.

4. The method of claim 1, wherein the acts of receiving, parsing, and distributing are carried out by a server dispatcher which executes on a server, and wherein said server dispatcher invokes said common interface to distribute said plurality of messages to said second plurality of objects.

5. A computer implemented method for facilitating communication across a network, comprising the acts of:
   receiving, on a first side of a network, a plurality of connection requests from a first plurality of objects, wherein each of said first plurality of objects is an independent object capable of independent operation and communication;
   processing said connection requests at run time to register said first plurality of objects with a communication mechanism to enable said first plurality of objects to communicate across said network;
   receiving, on said first side of said network, a plurality of messages from said first plurality of objects;
   storing said plurality of messages; and
   sending said plurality of messages as a message batch across said network to a second side of said network.

6. The method of claim 5, further comprising the acts of:
   receiving on said second side of said network said message batch;
   parsing said plurality of messages from said message batch; and
   distributing said plurality of messages to a second plurality of objects on said second side of said network.

7. The method of claim 6, wherein the acts of receiving said message batch, parsing, and distributing are carried out by a dispatcher, and wherein each of said second plurality of objects provides an implementation for a common interface which is invoked by said dispatcher to distribute said plurality of messages to said second plurality of objects.

8. The method of claim 6, wherein the act of processing comprises the act of establishing, for each of said first plurality of objects, a peer relationship with one of said second plurality of objects, and wherein messages are exchanged between peer objects.

9. In a computer system comprising a first dispatcher on a first side of a network, and a second dispatcher on a second side of said network, a computer implemented method for facilitating communication between objects across said network, comprising the acts of:
   receiving, by said first dispatcher, a first plurality of messages from a first plurality of objects, wherein each of said first plurality of objects is an independent object capable of independent operation and communication, and wherein each of said first plurality of objects provides an implementation for a first common interface;
   storing, by said first dispatcher, said first plurality of messages;
   sending, by said first dispatcher, said first plurality of messages as a first message batch across said network;
   receiving, by said second dispatcher, said first message batch;
   parsing, by said second dispatcher, said first plurality of messages from said first message batch; and
   distributing, by said second dispatcher, said first plurality of messages to a second plurality of objects, wherein each of said second plurality of objects is an independent object capable of independent operation and communication, and wherein each of said second plurality of objects provides an implementation for a second common interface which is invoked by said second dispatcher to distribute said first plurality of messages to said second plurality of objects.

10. The method of claim 9, further comprising the acts of:
    receiving, by said second dispatcher, a second plurality of messages from said second plurality of objects;
    storing, by said second dispatcher, said second plurality of messages;
    sending, by said second dispatcher, said second plurality of messages as a second message batch across said network;
    receiving, by said first dispatcher, said second message batch;
    parsing, by said first dispatcher, said second plurality of messages from said second message batch; and
    distributing, by said first dispatcher, said second plurality of messages to said first plurality of objects, wherein said first dispatcher invokes said first common interface to distribute said second plurality of messages to said first plurality of objects.

11. The method of claim 10, wherein said first common interface and said second common interface are the same interface.

12. The method of claim 10, wherein the following acts are performed prior to receiving said first plurality of messages:
    receiving, by said first dispatcher, a plurality of connection requests from said first plurality of objects; and
    processing, by said first dispatcher, said connection requests at run time to register said first plurality of objects with said first dispatcher to enable said first plurality of objects to communicate across said network.

13. The method of claim 12, wherein the act of processing comprises the act of:
    establishing, by said first dispatcher, in cooperation with said second dispatcher, for each of said first plurality of objects, a peer relationship with one of said second plurality of objects.

14. The method of claim 13, wherein messages are exchanged between objects having peer relationships.

15. An apparatus for facilitating communication between objects across a network, comprising:
    a mechanism for receiving on a second side of a network a message batch from a first side of said network, said message batch comprising a plurality of messages from a first plurality of objects;
    a mechanism for parsing said plurality of messages from said message batch; and
    a mechanism for distributing said plurality of messages to a second plurality of objects, wherein each of said second plurality of objects provides an implementation for a common interface, and wherein said mechanism for distributing invokes said common interface to distribute said plurality of messages to said second plurality of objects.

16. The apparatus of claim 15, wherein each of said second plurality of objects is an independent object capable of independent operation and communication.

17. An apparatus for facilitating communication across a network, comprising:

a mechanism for receiving, on a first side of a network, a plurality of connection requests from a first plurality of objects, wherein each of said first plurality of objects is an independent object capable of independent operation and communication;

a mechanism for processing said connection requests at run time to register said first plurality of objects to enable said first plurality of objects to communicate across said network;

a mechanism for receiving, on said first side of said network, a plurality of messages from said first plurality of objects;

a mechanism for storing said plurality of messages; and a mechanism for sending said plurality of messages as a message batch across said network to a second side of said network.

18. The apparatus of claim 17, further comprising:

a mechanism for receiving on said second side of said network said message batch;

a mechanism for parsing said plurality of messages from said message batch; and a mechanism for distributing said plurality of messages to a second plurality of objects on said second side of said network.

19. The apparatus of claim 18, wherein each of said second plurality of objects provides an implementation for a common interface, and wherein said mechanism for distributing invokes said common interface to distribute said plurality of messages to said second plurality of objects.

20. The apparatus of claim 17, wherein said mechanism for processing comprises a mechanism for establishing, for each of said first plurality of objects, a peer relationship with one of said second plurality of objects, and wherein messages are exchanged between peer objects.

21. A computer system, comprising:

a first dispatcher on a first side of a network; and a second dispatcher on a second side of said network; wherein said first dispatcher receives a first plurality of messages from a first plurality of objects, wherein each of said first plurality of objects is an independent object capable of independent operation and communication, and wherein each of said first plurality of objects provides an implementation for a first common interface;

said first dispatcher stores said first plurality of messages;

said first dispatcher sends said first plurality of messages as a first message batch across said network;

said second dispatcher receives said first message batch;

said second dispatcher parses said first plurality of messages from said first message batch; and said second dispatcher distributes said first plurality of messages to a second plurality of objects, wherein each of said second plurality of objects is an independent object capable of independent operation and communication, and wherein each of said second plurality of objects provides an implementation for a second common interface which is invoked by said second dispatcher to distribute said first plurality of messages to said second plurality of objects.

22. The system of claim 21, wherein said second dispatcher receives a second plurality of messages from said second plurality of objects;

said second dispatcher stores said second plurality of messages;

said second dispatcher sends said second plurality of messages as a second message batch across said network;

said first dispatcher receives said second message batch;

said first dispatcher parses said second plurality of messages from said second message batch; and said first dispatcher distributes said second plurality of messages to said first plurality of objects, wherein said first dispatcher invokes said first common interface to distribute said second plurality of messages to said first plurality of objects.

23. The system of claim 21, wherein said first common interface and said second common interface are the same interface.

24. The system of claim 21, wherein prior to receiving said first plurality of messages:

said first dispatcher receives a plurality of connection requests from said first plurality of objects; and said first dispatcher processes said connection requests at run time to register said first plurality of objects with said first dispatcher to enable said first plurality of objects to communicate across said network.

25. The system of claim 24, wherein said first dispatcher processes said connection requests by establishing, in cooperation with said second dispatcher, for each of said first plurality of objects, a peer relationship with one of said second plurality of objects.

26. The system of claim 25, wherein messages are exchanged between objects having peer relationships.

27. A computer readable medium having stored thereon a set of instructions, which, when executed by one or more processors, causes the one or more processors to facilitate communication between objects across a network, comprising:

instructions for causing one or more processors to receive on a second side of a network a message batch from a first side of said network, said message batch comprising a plurality of messages from a first plurality of objects;

instructions for causing one or more processors to parse said plurality of messages from said message batch; and instructions for causing one or more processors to distribute said plurality of messages to a second plurality of objects, wherein each of said second plurality of objects provides an implementation for a common interface, and wherein said common interface is invoked to distribute said plurality of messages to said second plurality of objects.

28. The computer readable medium of claim 27, wherein each of said second plurality of objects is an independent object capable of independent operation and communication.

29. A computer readable medium having stored thereon a set of instructions, which, when executed by one or more processors, causes the one or more processors to facilitate communication across a network, comprising:

instructions for causing one or more processors to receive, on a first side of a network, a plurality of connection requests from a first plurality of objects, wherein each of said first plurality of objects is an independent object capable of independent operation and communication;

instructions for causing one or more processors to process said connection requests at run time to register said first plurality of objects with a communication mechanism to enable said first plurality of objects to communicate across said network;

instructions for causing one or more processors to receive, on said first side of said network, a plurality of messages from said first plurality of objects;

instructions for causing one or more processors to store said plurality of messages; and instructions for causing one or more processors to send said plurality of messages as a message batch across said network to a second side of said network.

30. The computer readable medium of claim 29, further comprising:

instructions for causing one or more processors to receive on said second side of said network said message batch;

instructions for causing one or more processors to parse said plurality of messages from said message batch; and instructions for causing one or more processors to distribute said plurality of messages to a second plurality of objects on said second side of said network.

31. The computer readable medium of claim 30, wherein each of said second plurality of objects provides an implementation for a common interface which is invoked to distribute said plurality of messages to said second plurality of objects.

32. The computer readable medium of claim 29, wherein said instructions for causing one or more processors to process said connection requests comprises:

instructions for causing one or more processors to establish, for each of said first plurality of objects, a peer relationship with one of said second plurality of objects, and wherein messages are exchanged between peer objects.

33. A computer readable medium having stored thereon a set of instructions, which, when executed by one or more processors, causes the one or more processors to facilitate communication across a network, comprising:

instructions for causing one or more processors to receive, on a first side of a network, a first plurality of messages from a first plurality of objects, wherein each of said first plurality of objects is an independent object capable of independent operation and communication, and wherein each of said first plurality of objects provides an implementation for a first common interface;

instructions for causing one or more processors to store said first plurality of messages;

instructions for causing one or more processors to send said first plurality of messages as a first message batch across said network;

instructions for causing one or more processors to receive, on a second side of said network, said first message batch;

instructions for causing one or more processors to parse said first plurality of messages from said first message batch; and instructions for causing one or more processors to distribute said first plurality of messages to a second plurality of objects, wherein each of said second plurality of objects is an independent object capable of independent operation and communication, wherein each of said second plurality of objects provides an implementation for a second common interface, and wherein said common interface is invoked to distribute said first plurality of messages to said second plurality of objects.

34. The computer readable medium of claim 33, further comprising:

instructions for causing one or more processors to receive on said second side of said network, a second plurality of messages from said second plurality of objects;

instructions for causing one or more processors to store said second plurality of messages;

instructions for causing one or more processors to send said second plurality of messages as a second message batch across said network;

instructions for causing one or more processors to receive on said first side of said network said second message batch;

instructions for causing one or more processors to parse said second plurality of messages from said second message batch; and instructions for causing one or more processors to distribute said second plurality of messages to said first plurality of objects, wherein said first common interface is invoked to distribute said second plurality of messages to said first plurality of objects.

35. The computer readable medium of claim 34, wherein said first common interface and said second common interface are the same interface.

36. The computer readable medium of claim 34, further comprising:

instructions for causing one or more processors to receive on said first side of said network, prior to receiving said first plurality of messages, a plurality of connection requests from said first plurality of objects; and instructions for causing one or more processors to process said connection requests at run time to register said first plurality of objects with said first dispatcher to enable said first plurality of objects to communicate across said network.

37. The computer readable medium of claim 36, wherein said instructions for causing one or more processors to process said connection requests comprises:

instructions for causing one or more processors to establish, for each of said first plurality of objects, a peer relationship with one of said second plurality of objects.

38. The computer readable medium of claim 37, wherein messages are exchanged between objects having peer relationships.

* * * * *